United States Patent
Ajisaka

(10) Patent No.: US 11,628,889 B2
(45) Date of Patent: Apr. 18, 2023

(54) VEHICLE UNIT INSTALLATION STRUCTURE

(71) Applicant: TOYOTA JIDOSHA KABUSHIKI KAISHA, Aichi-ken (JP)

(72) Inventor: Satoshi Ajisaka, Okazaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 86 days.

(21) Appl. No.: 17/190,396

(22) Filed: Mar. 3, 2021

(65) Prior Publication Data

US 2021/0276624 A1 Sep. 9, 2021

(30) Foreign Application Priority Data

Mar. 6, 2020 (JP) .............................. JP2020-039225

(51) Int. Cl.
  *B62D 25/20* (2006.01)
  *B60K 6/24* (2007.10)
  *B60L 50/70* (2019.01)
  *B60K 6/26* (2007.10)

(52) U.S. Cl.
  CPC ............. *B62D 25/20* (2013.01); *B60K 6/24* (2013.01); *B60K 6/26* (2013.01); *B60L 50/70* (2019.02); *B60Y 2200/92* (2013.01)

(58) Field of Classification Search
  CPC ............. B62D 25/20; B62D 25/2009; B62D 25/2018; H01M 2250/20; B60Y 2200/92; B60Y 2200/90; B60Y 2306/01; B60L 50/70; B60L 50/72; B60L 50/71; B60L 50/50; B60L 50/10; B60L 50/60; B60L 50/61; B60K 6/24; B60K 6/26; B60K 6/40; B60K 6/46; B60K 6/00; B60K 6/22; B60K 6/20; B60K 2001/001; B60K 1/00; B60K 1/02
  See application file for complete search history.

(56) References Cited

U.S. PATENT DOCUMENTS

| | | | | |
|---|---|---|---|---|
| 7,188,893 B2 * | 3/2007 | Akasaka | ............ | B62D 25/2045 296/193.08 |
| 7,726,429 B2 * | 6/2010 | Suzuki | ................. | B62D 21/152 180/232 |
| 8,689,925 B2 * | 4/2014 | Ajisaka | .................. | B60K 13/04 180/68.2 |
| 8,888,168 B2 * | 11/2014 | Kuwabara | ............ | B62D 25/082 296/187.1 |
| 9,188,052 B2 | 11/2015 | Tajima | | |

(Continued)

FOREIGN PATENT DOCUMENTS

| | | |
|---|---|---|
| DE | 102013204313 A1 | 10/2013 |
| DE | 102018100491 A1 | 7/2018 |

(Continued)

*Primary Examiner* — James M Dolak
(74) *Attorney, Agent, or Firm* — Hauptman Ham, LLP

(57) ABSTRACT

A vehicle unit installation structure has: a power generating unit that is installed at a front portion of a vehicle; a driving unit that is installed at a vehicle rear side of the power generating unit, and that drives front wheels of the vehicle; and a floor tunnel that is formed at a floor that is disposed at a vehicle rear side of the driving unit, a width of a front end portion of the floor tunnel being greater than a width of at least a rear end portion of the driving unit.

10 Claims, 5 Drawing Sheets

(56) References Cited

U.S. PATENT DOCUMENTS

| | | | |
|---|---|---|---|
| 9,260,065 B2* | 2/2016 | Tanigaki | B60K 1/04 |
| 9,944,173 B2* | 4/2018 | Ajisaka | B60K 1/04 |
| 10,181,616 B2* | 1/2019 | Murata | B62D 21/152 |
| 10,214,100 B2* | 2/2019 | Ajisaka | B60K 15/04 |
| 10,259,309 B2* | 4/2019 | Ajisaka | B60K 6/46 |
| 11,124,135 B2* | 9/2021 | Yamada | B60L 50/64 |
| 11,180,017 B2* | 11/2021 | Shinkai | B60K 17/04 |
| 11,364,783 B2* | 6/2022 | Toda | B60L 50/40 |
| 11,492,044 B2* | 11/2022 | Shimokouchi | B60K 1/00 |
| 2007/0138882 A1* | 6/2007 | Tsukashima | H02K 5/225 |
| | | | 310/71 |
| 2011/0168468 A1* | 7/2011 | Taguchi | B60L 15/20 |
| | | | 180/65.245 |
| 2013/0320709 A1 | 12/2013 | Kuwabara et al. | |
| 2018/0205106 A1 | 7/2018 | Murata et al. | |
| 2018/0222307 A1 | 8/2018 | Fujiyoshi et al. | |
| 2019/0031013 A1 | 1/2019 | Ajisaka | |
| 2019/0232895 A1 | 8/2019 | Kamada et al. | |

FOREIGN PATENT DOCUMENTS

| | | |
|---|---|---|
| DE | 102019201063 A1 | 8/2019 |
| DE | 102016003689 B4 | 10/2021 |
| EP | 2402197 B1 | 10/2013 |
| JP | 201012963 A | 1/2010 |
| JP | 201211900 A | 1/2012 |
| JP | 2018127124 A | 8/2018 |
| JP | 201925934 A | 2/2019 |
| JP | 2019107962 A | 7/2019 |

* cited by examiner

VEHICLE UNIT INSTALLATION STRUCTURE

CROSS-REFERENCE TO RELATED APPLICATION

This application is based on and claims priority under 35 USC 119 from Japanese Patent Application No. 2020-039225 filed on Mar. 6, 2020, the disclosure of which is incorporated by reference herein.

BACKGROUND

Technical Field

The present disclosure relates to a vehicle unit installation structure.

Related Art

There is conventionally known a vehicle in which a generator is installed. This vehicle has a generator, an engine that drives the generator, and a motor that drives the driving wheels. The generator and the engine are disposed so as to be lined-up in the vehicle longitudinal direction (see, for example, Japanese Patent Application Laid-Open (JP-A) No. 2019-107962).

However, because both the generator and the engine are members that are hard to crush, when these members are lined-up in the vehicle longitudinal direction, the crush stroke is small at the time when the vehicle is involved in a front collision. Even so, if an attempt is made to ensure the crush stroke, the front overhang becomes large. In this way, in a vehicle in which members that are hard to crush are disposed so as to be lined-up in the vehicle longitudinal direction, there is room for improvement with respect to the structure that ensures the crush stroke.

SUMMARY

Thus, an object of the present disclosure is to provide a vehicle unit installation structure that can ensure the crush stroke even if a power generating unit and a driving unit are disposed so as to be lined-up in the vehicle longitudinal direction.

In order to achieve the above-described object, a vehicle unit installation structure of a first aspect relating to the present disclosure has: a power generating unit that is installed at a front portion of a vehicle; a driving unit that is installed at a vehicle rear side of the power generating unit, and that drives front wheels of the vehicle; and a floor tunnel that is formed at a floor that is disposed at a vehicle rear side of the driving unit, a width of a front end portion of the floor tunnel being greater than a width of at least a rear end portion of the driving unit.

In accordance with the first aspect of the present disclosure, when a load is inputted from the vehicle front side, the subframe that supports the driving unit separates from the front side members. Here, the power generating unit and the driving unit are members that are hard to crush. Accordingly, when the vehicle is involved in a front collision and the power generating unit moves rearward, the driving unit moves rearward and downward. However, because the width of the front end portion of the floor tunnel is made to be larger than the width of at least the rear end portion of the driving unit, at least the rear end portion of the driving unit enters into the inner side of the front end portion of the floor tunnel, and the amounts of rearward movement of the power generating unit and the driving unit increase. Accordingly, the crush stroke is ensured.

A vehicle unit installation structure of a second aspect of the present disclosure has: a power generating unit that is installed in a front portion of a vehicle; a driving unit that is installed at a vehicle rear side of the power generating unit, and that drives front wheels; and a floor tunnel that is formed at a floor that is disposed at a vehicle rear side of the driving unit, and at which a width and a height of a front end portion are greater than a width and a height of at least a rear end portion of the driving unit.

In accordance with the second aspect of the present disclosure, the width and the height of the front end portion of the floor tunnel are made to be larger than the width and the height of at least the rear end portion of the driving unit. Here, the power generating unit and the driving unit are members that are hard to crush. Accordingly, when the vehicle is involved in a front collision, the power generating unit moves rearward, and the driving unit moves rearward. However, because the width and the height of the front end portion of the floor tunnel are made to be larger than the width and the height of the rear end portion of the driving unit, at least the rear end portion of the driving unit enters into the inner side of the front end portion of the floor tunnel, and the amounts of rearward movement of the power generating unit and the driving unit increase. Accordingly, the crush stroke is ensured.

In a vehicle unit installation structure of a third aspect of the present disclosure, in the vehicle unit installation structure of the first aspect, a subframe that supports the driving unit is supported at front side members, and the subframe is structured so as to separate from the front side members when a load is inputted from a vehicle front side.

In accordance with the third aspect of the present disclosure, when a load is inputted from the vehicle front side, the subframe that supports the driving unit separates from the front side members. Accordingly, as compared with a structure in which a subframe that supports the driving unit does not separate from the front side members, the degrees of freedom of the driving unit increase, and at least the rear end portion of the driving unit smoothly enters into the inner side of the front end portion of the floor tunnel. Accordingly, the amounts of rearward movement of the power generating unit and the driving unit increase effectively.

In a vehicle unit installation structure of a fourth aspect of the present disclosure, in the vehicle unit installation structure of the second aspect, a subframe that supports the driving unit is supported at front side members, and the subframe is structured so as to separate from the front side members when a load is inputted from a vehicle front side.

In accordance with the fourth aspect of the present disclosure, when a load is inputted from the vehicle front side, the subframe that supports the driving unit separates from the front side members. Accordingly, as compared with a structure in which a subframe that supports the driving unit does not separate from the front side members, the degrees of freedom of the driving unit increase, and at least the rear end portion of the driving unit smoothly enters into the inner side of the front end portion of the floor tunnel. Accordingly, the amounts of rearward movement of the power generating unit and the driving unit increase effectively.

In a vehicle unit installation structure of a fifth aspect of the present disclosure, in the vehicle unit installation structure of any one of the first through third aspects, the power generating unit is an engine, which is used only for power generation, and a generator.

In accordance with the fifth aspect of the present disclosure, the power generating unit is structured by an engine, which is used only for power generation, and a generator. Accordingly, the crush stroke is ensured in an electric vehicle that uses the engine only for power generation.

In a vehicle unit installation structure of a sixth aspect of the present disclosure, in the vehicle unit installation structure of any one of the first through third aspects, the power generating unit is a fuel cell stack.

In accordance with the sixth aspect of the present disclosure, the power generating unit is a fuel cell stack. Accordingly, the crush stroke is ensured in a fuel cell vehicle.

In a vehicle unit installation structure of a seventh aspect of the present disclosure, in the vehicle unit installation structure of the second aspect, a width and a height of the front end portion of the floor tunnel are made to be greater than a maximum width and a maximum height of the driving unit.

In accordance with the seventh aspect of the present disclosure, because the entire driving unit can enter into the interior of the floor tunnel, the crush stroke can be lengthened more.

As described above, in accordance with present disclosure, the crush stroke can be ensured even if the power generating unit and the driving unit are disposed so as to be lined-up in the vehicle longitudinal direction.

BRIEF DESCRIPTION OF THE DRAWINGS

Exemplary embodiments of the present disclosure will be described in detail based on the following figures, wherein.

DETAILED DESCRIPTION

An embodiment relating to the present disclosure is described in detail hereinafter on the basis of the drawings. Note that, for convenience of explanation, arrow UP that is shown appropriately in the respective drawings indicates the vehicle upward direction, arrow FR indicates the vehicle frontward direction, and arrow RH indicates the vehicle rightward direction. Accordingly, in the following description, when vertical, longitudinal and left-right directions are used without being specified, they refer to the vertical of the vehicle vertical direction, the longitudinal of the vehicle longitudinal direction, and the left and the right of the vehicle left-right direction (the vehicle transverse direction).

Figure 1:
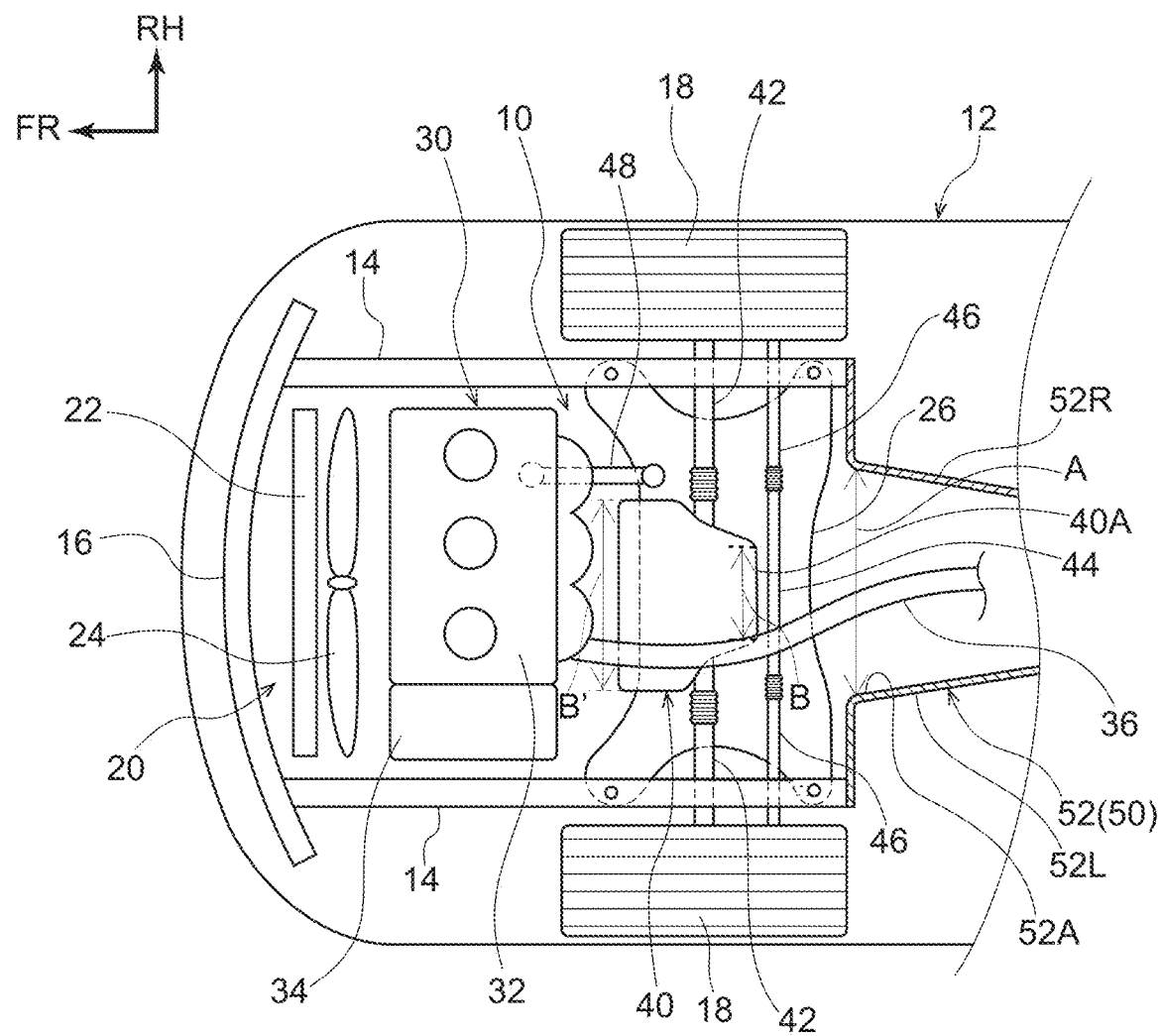
FIG. 1 is a plan view showing a vehicle unit installation structure relating to a present embodiment.
Figure 2:
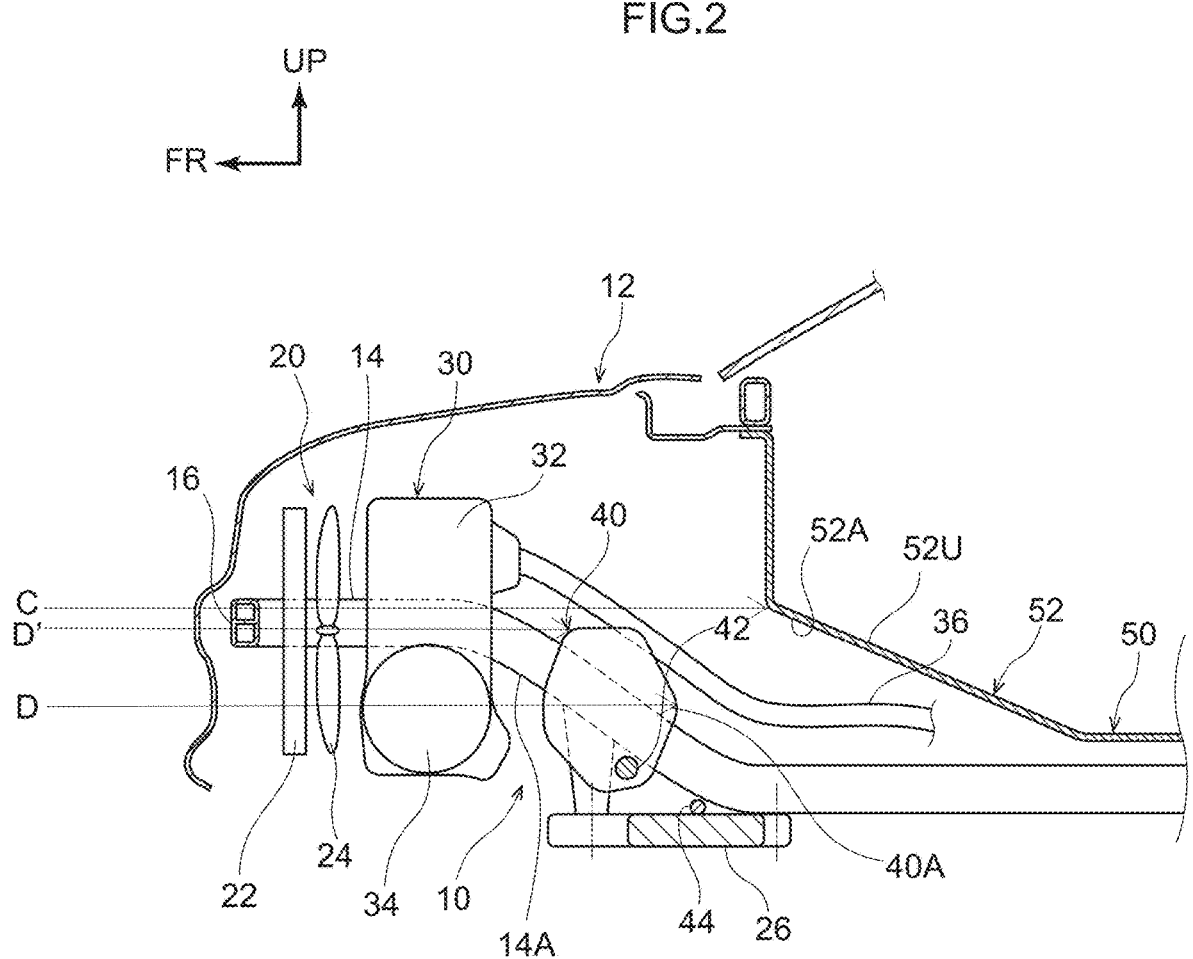
FIG. 2 is a side view showing the vehicle unit installation structure relating to the present embodiment.

As shown in FIG. 1 and FIG. 2, a pair of left and right front side members 14 that extend in the longitudinal direction are disposed at the front portion of a vehicle 12 that is provided with a vehicle unit installation structure 10 relating to the present embodiment. A front bumper reinforcement 16 that extends substantially in the vehicle transverse direction is bridged between the front end portions of the respective front side members 14.

An engine 32 and a generator 34 that serve as a power generating unit 30 are installed in the front portion of the vehicle 12, between the left and right front side members 14. As seen in a plan view, the engine 32 is installed with the vehicle transverse direction being the length direction thereof, and the generator 34 is provided integrally with a vehicle transverse direction one end portion (e.g., the left end portion) of the engine 32.

Further, the generator 34 and the vehicle transverse direction another end portion (e.g., the right end portion) of the engine 32 are supported via supporting members (not illustrated) at the left and right front side members 14, respectively. Note that the engine 32 is supported, via a torque rod 48, also at a suspension member 26 that is described later. Further, an exhaust pipe 36 extends toward the rear side from the upper portion of the rear end of the engine 32.

The engine 32 is used only for generating power. The generator 34 generates power due to a power generating motor (not illustrated) rotating due to driving force of the engine 32. Note that a cooling unit 20 for engine cooling is installed at the rear side of the front bumper reinforcement 16 and the front side of the engine 32. The cooling unit 20 is structured to include a radiator 22 and a fan 24.

The suspension member 26, which serves as a subframe that supports front wheels 18 via lower arms (not illustrated), is disposed at the rear side and the lower side of the engine 32 (the power generating unit 30). The suspension member 26 is formed substantially in the shape of a flat plate whose length direction is the vehicle transverse direction, and is supported in a state of hanging-down from the left and right front side members 14.

More concretely, as shown in FIG. 2, the rear sides of the left and right front side members 14 are bent and extend obliquely downward (hereinafter, these regions are called "kick portions 14A"), and the lower end portions thereof extend further rearward. The vehicle transverse direction outer side front end portions of the suspension member 26 are mounted by fastening by bolts to intermediate portions of the kick portions 14A. The vehicle transverse direction outer side rear end portions of the suspension member 26 are mounted by fastening by bolts to the lower end portions of the kick portions 14A.

Figure 3:
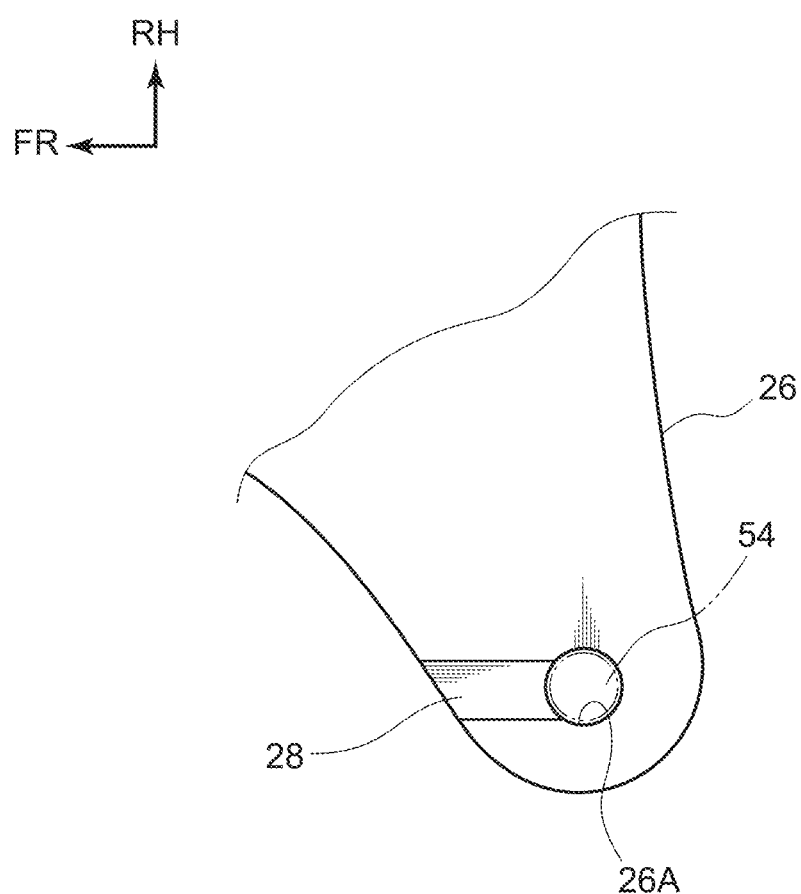
FIG. 3 is a plan view showing, in an enlarged manner, a portion of a suspension member.

Note that, as shown in FIG. 3, when a load is inputted from the front side due to a front collision of the vehicle 12 or the like, at least the vehicle transverse direction outer side rear end portions of the suspension member 26 separate from the kick portions 14A of the front side members 14. Namely, weak portions 28 that are formed in shapes of thin plates are formed as separating means at the vehicle transverse direction outer side rear end portions of the suspension member 26, at the front sides of through-holes 26A for bolt insertion. When the suspension member 26 moves rearward, these weak portions 28 are broken by the shaft portions of bolts 54.

Further, as shown in FIG. 1 and FIG. 2, a driving unit 40 that rotates and drives the front wheels 18 is installed at the rear of the engine 32 (the power generating unit 30), at the vehicle transverse direction central portion of the upper portion of the suspension member 26. The driving unit 40 is structured to include a driving motor (not illustrated) and a differential gear (not illustrated), and is supported at the upper portion of the suspension member 26 via a supporting member (not illustrated). Further, drive shafts 42, which extend from the driving unit 40 toward the vehicle transverse direction outer sides, are connected to the front wheels 18.

In this way, the vehicle unit installation structure 10 relating to the present embodiment employs a structure in which the power generating unit 30 (the engine 32 and the generator 34) and the driving unit 40 are apart at the front and the rear. Further, a steering gearbox 44 is disposed at the rear side of the driving unit 40, at the upper portion of the suspension member 26. Tie rods 46 that extend from the steering gearbox 44 toward the vehicle transverse direction outer sides are connected to the front wheels 18.

A floor 50 is disposed at the rear side of the driving unit 40. A floor tunnel 52, which is substantially upside-down U-shaped in cross-section and at which the width A (the length along the vehicle transverse direction) of a front end portion 52A is made to be larger than the width B (the length along the vehicle transverse direction) of at least a rear end portion 40A of the driving unit 40 as seen in a plan view, is formed in the vehicle transverse direction central portion of the floor 50. Namely, a left side wall 52L and a right side wall 52R at the front end portion 52A of the floor tunnel 52 are inclined walls that gradually become wider toward the front side, as seen in a plan view.

Note that, as seen in a side view, also the height C of the front end portion 52A of the floor tunnel 52 is set to be higher than the height D of at least the rear end portion 40A of the driving unit 40. In other words, a ceiling wall 52U at the front end portion 52A of the floor tunnel 52 is an inclined wall that gradually becomes higher toward the front side. The height position of the front end portion of the ceiling wall 52U is disposed at a position that is higher than the height position of at least the rear end portion 40A of the driving unit 40. Further, the exhaust pipe 36 extends through the inner side of the floor tunnel 52 toward the rear side.

Operation of the vehicle unit installation structure 10 that is structured as described above is described next.

Figure 4:
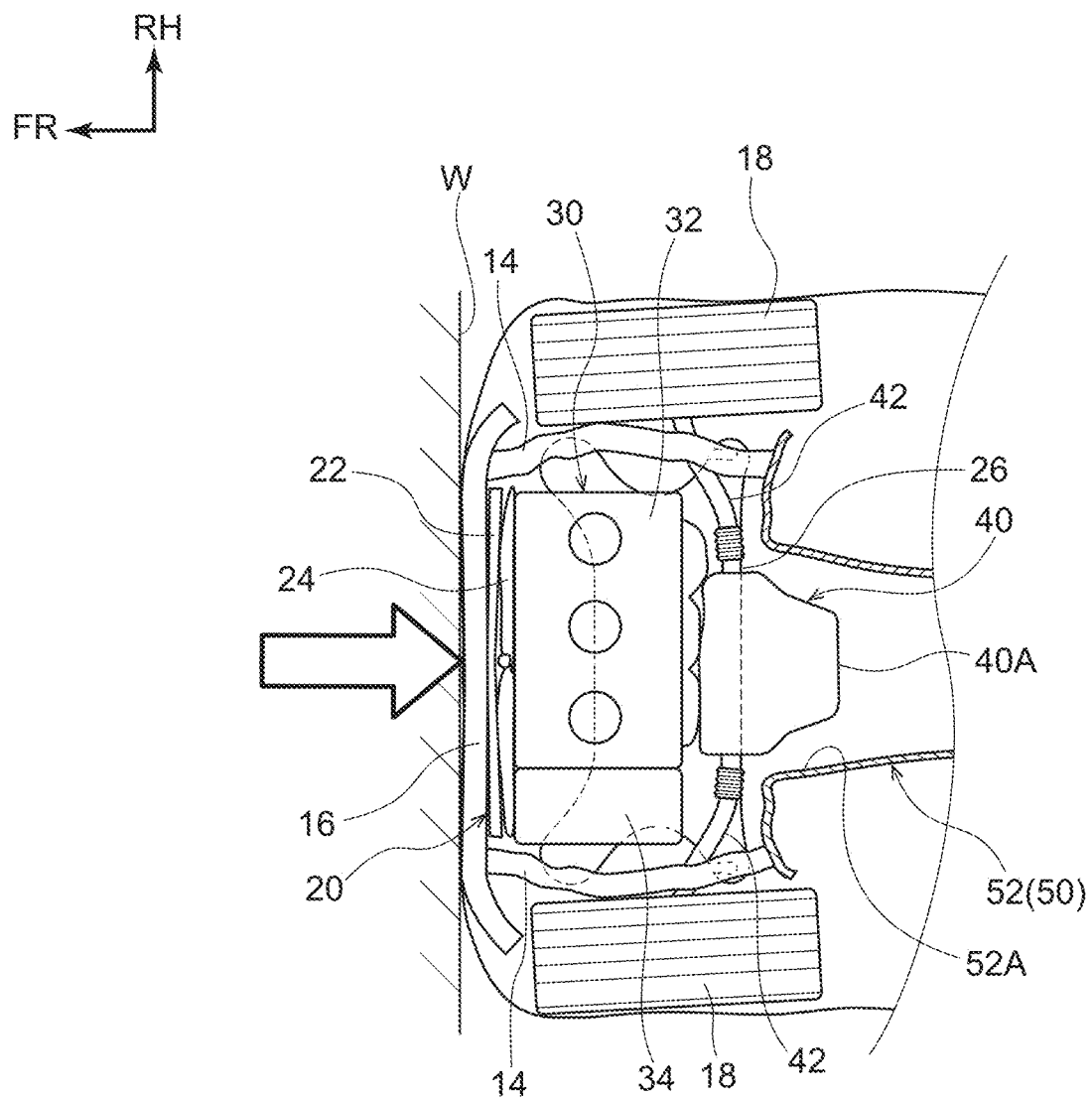
FIG. 4 is a plan view showing a state after a front collision of a vehicle that has the vehicle unit installation structure relating to the present embodiment.

As shown in FIG. 4, when the vehicle 12 front-collides with, for example, obstacle W (when a load is inputted from the front side), the power generating unit 30 (the engine 32 and the generator 34), together with the front bumper reinforcement 16 and the cooling unit 20, moves relatively toward the rear side (move rearward) while the front side members 14 compressively deform in the axial directions. Thereupon, the power generating unit 30 (the engine 32 and the generator 34) is pushed, and the driving unit 40 moves relatively toward the rear side (moves rearward).

Here, the power generating unit 30 and the driving unit 40 are members that are hard to crush. Further, as seen in a plan view, the width of the front end portion 52A of the floor tunnel 52 is made to be greater than the width of at least the rear end portion 40A of the driving unit 40, and, as seen in a side view, the height of the front end portion 52A of the floor tunnel 52 is made to be higher (greater) than the height of at least the rear end portion 40A of the driving unit 40. Accordingly, at least the rear end portion 40A of the driving unit 40 that has moved relatively toward the rear side (has moved rearward) enters into the inner side of the front end portion 52A of the floor tunnel 52.

Due thereto, the amounts of rearward movement of the power generating unit 30 and the driving unit 40 can be increased, and, in an electric vehicle that serves as the vehicle 12 and at which the engine 32 is only for power generation, the crush stroke can be ensured. Namely, at the time of a front collision of the vehicle 12, the safety of the vehicle occupants can be improved without making the front overhang large. Note that, when the crush stroke can be ensured in this way, the number of reinforcing members and the like that serve as countermeasures at the time of a front collision, can be reduced at the vehicle 12, and therefore, lightening of the weight of the vehicle 12 also can be devised.

Further, because a structure is employed in which the power generating unit 30 and the driving unit 40 are separate and are disposed front and rear, the assembled width of the front side members 14 can be made to be the same assembled width as, for example, that of a front engine/rear wheel drive vehicle (can be made to be a relatively narrow assembled width). Accordingly, the cutting angle of the front wheels 18 can be improved, and the wheel base (the length of the passenger cabin in the longitudinal direction) at the vehicle 12 can be lengthened. Further, large-diameter tires can be set at the front wheels 18, and, in this case, the design of the vehicle 12 can be improved, and the vehicle dynamic performance and braking performance can be improved.

Further, due to load being inputted from the front side, at the time when the suspension member 26 that supports the driving unit 40 moves rearward, due to the shaft portions of the bolts 54 breaking the weak portions 28, the suspension member 26 separates from the front side members 14. Accordingly, as compared with a structure in which the suspension member 26 does not separate from the front side members 14, the degrees of freedom of the driving unit 40 increase, and at least the rear end portion 40A of the driving unit 40 can smoothly enter into the inner side of the front end portion 52A of the floor tunnel 52. Accordingly, the amounts of rearward movement of the power generating unit 30 and the driving unit 40 can be increased effectively.

Note that, when the suspension member 26 is a structure that separates the front side members 14, the driving unit 40 moves relatively rearward and downward. Accordingly, in this case, even if even if the height of the front end portion 52A of the floor tunnel 52 is not made to be higher (larger) than the height of at least the rear end portion 40A of the driving unit 40 as seen in a side view, at least the rear end portion 40A of the driving unit 40, that has moved relatively rearward and downward, can enter into the inner side of the front end portion 52A of the floor tunnel 52.

Namely, if there is a structure in which the suspension member 26 separates from the front side members 14, and the driving unit 40 moves relatively rearward and downward, it suffices for the height of the front end portion 52A of the floor tunnel 52 to be less than or equal to the height of the rear end portion 40A of the driving unit 40 as seen in a side view. In the case of this structure, it suffices for the width of at least the front end portion 52A of the floor tunnel 52 to be made to be larger than the width of at least the rear end portion 40A of the driving unit 40.

Further, members to which it is difficult for load to be transmitted at the time of a collision, such as auxiliary equipment parts or the like including harnesses and resin brackets (resin members) and the like that are mounted to the driving unit 40, are excluded from the driving unit 40 of the present exemplary embodiment. Namely, the size of the rear end portion 40A of the driving unit 40 in the present embodiment is the size of the housing of the driving unit 40.

Modified Example

Figure 5:
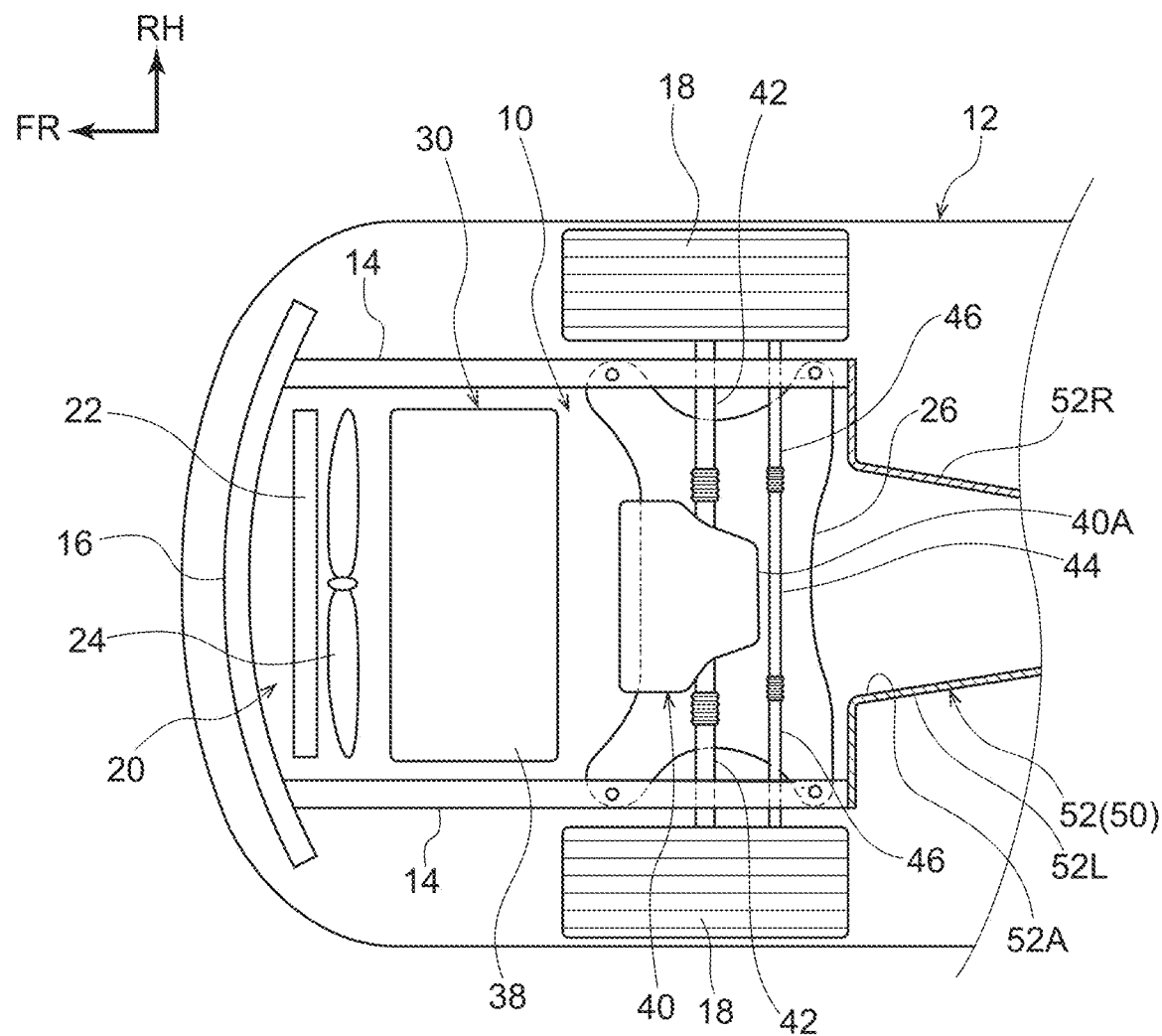
FIG. 5 is a plan view showing a modified example of the vehicle unit installation structure relating to the present embodiment.

As shown in FIG. 5, the power generating unit 30 may be a fuel cell stack 38. In this case as well, at the time of a front collision of the vehicle 12, operation that is similar to that described above is obtained. Namely, the crush stroke can be ensured in a fuel cell vehicle that serves as the vehicle 12.

Further, the vehicle 12 of the present embodiment can be easily switched between an electric vehicle and a fuel cell vehicle merely by switching the engine 32 and the generator 34, and the fuel cell stack 38. Namely, because the power generating unit 30 and the driving unit 40 are separate, the fuel cell stack 38, which has plural fuel cells that are susceptible to vibrations of the motor for driving, also can be installed in the vehicle 12.

Although the vehicle unit installation structure 10 relating to the present embodiment has been described above on the basis of the drawings, the vehicle unit installation structure 10 relating to the present embodiment is not limited to the illustrated structure, and the design thereof can be changed appropriately within a scope that does not depart from the gist of the present disclosure.

For example, the width and the height of the front end portion 52A of the floor tunnel 52 may be formed to be larger than the maximum width B' and the maximum height D' of the driving unit 40. In this case, because the entire driving unit 40 can be made to enter into the interior of the floor tunnel 52, the crush stroke can be lengthened.

Further, the ceiling wall 52U, the left side wall 52L and the right side wall 52R at the front end portion 52A of the floor tunnel 52 are not limited to shapes that gradually become wider toward the front side (inclined walls), and, for example, may be formed in the shapes of steps that become wider in a stepwise manner toward the front side, or the like.

Further, the separating means that causes the suspension member 26 to separate from the front side members 14 is not limited to the weak portions 28. The separating means may be structured such that, at the time when a load is inputted from the front side and the suspension member 26 moves rearward, the suspension member 26 is separated from the front side members 14 due to, for example, the shaft portions of the bolts 54 being broken (severed).

What is claimed is:

1. A vehicle unit installation structure comprising:
   a power generating unit that is installed at a front portion of a vehicle;
   a driving unit that is installed at a vehicle rear side of the power generating unit, and that drives front wheels of the vehicle; and
   a floor tunnel that is formed by a floor of the vehicle, and that is disposed at the vehicle rear side of the driving unit,
   wherein
   the driving unit is disposed to be outside of the floor tunnel, and
   a width of a front end portion of the floor tunnel in a width direction of the vehicle is greater than a width of at least a rear end portion of the driving unit in the width direction of the vehicle to allow the driving unit to move from outside of the floor tunnel to inside of the floor tunnel in response to a load being inputted from a vehicle front side of the vehicle.

2. The vehicle unit installation structure of claim 1, wherein
   a height of the front end portion of the floor tunnel is greater than a height of at least the rear end portion of the driving unit.

3. The vehicle unit installation structure of claim 1, wherein
   the driving unit is supported by a subframe of the vehicle the subframe being supported by front side members of the vehicle, and
   the subframe is separated from the front side members in response to the load being inputted from the vehicle front side of the vehicle.

4. The vehicle unit installation structure of claim 2, wherein
   the driving unit is supported by a subframe of the vehicle the subframe being supported by front side members of the vehicle, and
   the subframe is separated from the front side members in response to the load being inputted from the vehicle front side of the vehicle.

5. The vehicle unit installation structure of claim 1, wherein the power generating unit comprises
   an engine, which is used only for power generation, and
   a generator.

6. The vehicle unit installation structure of claim 1, wherein the power generating unit is a fuel cell stack.

7. The vehicle unit installation structure of claim 2, wherein
   the width of the front end portion of the floor tunnel is greater than a maximum width of the driving unit, and
   a height of the front end portion of the floor tunnel is greater than a maximum height of the driving unit.

8. The vehicle unit installation structure of claim 1, wherein
   the floor tunnel includes left and right side walls opposing each other in the width direction of the vehicle, and
   a distance between the left and right side walls in the width direction of the vehicle gradually becomes wider towards the front end portion of the floor tunnel.

9. The vehicle unit installation structure of claim 3, wherein
   the subframe is separated from the front side members to cause the driving unit to move downward in response to the load being inputted from the vehicle front side of the vehicle.

10. The vehicle unit installation structure of claim 4, wherein
    the subframe is separated from the front side members to cause the driving unit to move downward in response to the load being inputted from the vehicle front side of the vehicle.

* * * * *